3,080,386
3α,4α AND 5β,6β-CYCLOPROPANO-PREGNENE
DERIVATIVES
Lawrence H. Knox, Mexico City, Mexico, assignor to
Syntex S.A., Mexico City, Mexico, a corporation of
Mexico
No Drawing. Filed Apr. 13, 1962, Ser. No. 187,203
20 Claims. (Cl. 260—397.1)

The present invention relates to novel cyclopentanophenanthrene derivatives and to a process for the production thereof.

More particularly, the present invention relates to novel 3α,4α - (cyclopropano) - Δ⁵-pregnen-20-one, 5β,6β-(cyclopropano)-Δ³-pregnen-20-one derivatives, to the 17α-hydroxy, 16-methyl and 16α-hydroxy derivatives thereof, to the corresponding 17α- and/or 16α-hydrocarbon carboxylic acid esters and to the corresponding 16α,17α-cyclic acetals and ketals.

The novel compounds of the present invention are represented by the following formulas:

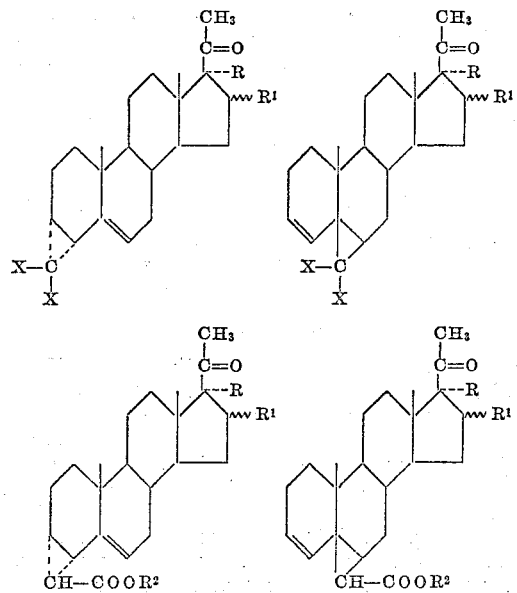

In the above formulas X represents hydrogen, fluorine or chlorine; R may be hydrogen, hydroxyl or a hydrocarbon carboxylic acyloxy group of less than 12 carbon atoms; R¹ indicates hydrogen, α-methyl, β-methyl, α-hydroxyl or an α-hydrocarbon carboxylic acyloxy group of less than 12 carbon atoms; R and R¹ together represent the group

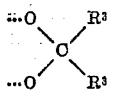

wherein R³ is a lower alkyl; and R² represents hydrogen or a lower alkyl group.

The acyloxy groups are derived from hydrocarbon carboxylic acids containing less than 12 carbon atoms which may be saturated or unsaturated, of straight, branched cylic or cyclic-aliphatic chain, aromatic and may be substituted by functional groups such as hydroxy, alkoxy containing up to 5 carbon atoms, acyloxy containing up to 12 carbon atoms, nitro, amino or halogen. Typical ester groups are the acetate, propionate, enanthate, benzoate, trimethylacetate, t-butylacetate, phenoxyacetate, cyclopentylpropionate, aminoacetate and β-chloropropionate.

The compounds represented by the above formulas are active progestational agents, possessing anti-ovulatory, anti-estrogenic, and anti-gonadotrophic properties.

The novel compounds of the present invention are prepared by the process illustrated by the following equation:

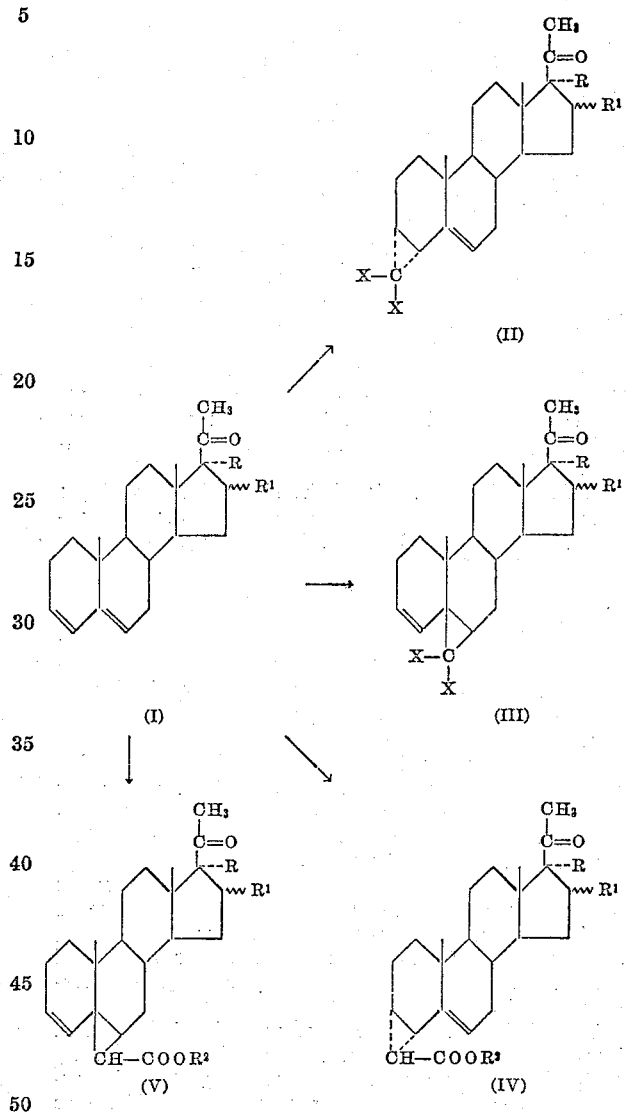

In the above formulas R, R¹, R² and X have the same meaning as previously set forth.

The starting compound (I) of the process just outlined outlined is prepared from the corresponding Δ⁵-pregnen-3β-ol-20-one derivative by conventional tosylation in pyridine with tosyl chloride, followed by conventional dehydrotosylation of the obtained 3-tosylate in collidine, at reflux temperature, for a period of time of the order of 1½ hours. The starting compound (I) thus produced is selected from the group consisting of Δ³,⁵-pregnadien-20-one and the 16-methyl, 16α-hydroxy, 16α-acyloxy, 17α-hydroxy, 17α-acyloxy and 16α,17α-(di-lower alkyl) methylenedioxy derivatives thereof.

In accordance with the above equation, the starting compound (I) is treated with an alkali metal trichloroacetate, preferably sodium trichloroacetate, in a suitable solvent such as bis-(2-methoxyethyl) ether at approximately 125° C. for a period of time of the order of 1½ hours and the product thus obtained is chromatographed, for example on Florisil, thus affording the corresponding 1',1' - dichlorocyclopropano - (2',3';3α,4α) - Δ⁵ - pregnen- 20-one (II; X=Cl) and 1',1'-dichlorocyclopropano-(2'3'; 5β,6β)-Δ³-pregnen-20-one (III; X=Cl) derivatives.

Upon treatment of the starting compound (I) with diazomethane in the presence of copper powder, followed by chromatography of the resulting product, there are obtained the corresponding cyclopropano-(1',2';3α,4α)-Δ⁵-pregnen-20-one (II; X=H) and cyclopropano-(1',2';5β,6β)-Δ³-pregnen-20-one (III; X=H) derivatives.

Upon reaction of the starting compound (I) with an alkali metal monochlorodifluoroacetate, preferably sodium monochlorodifluoroacetate, in a suitable solvent such as diglyme, at reflux temperature, for a period of time of the order of 20 minutes, followed by chromatography of the resulting product, there are produced the corresponding 1',1' - difluorocyclopropano - (2',3';3α,4α)-Δ⁵-pregnen-20-one (II; X=F) and 1',1'-difluorocyclopropano-(2',3';5β,6β)-Δ³-pregnen-20-one (III; X=F) derivatives.

The reaction of the starting compound (I) with a lower alkyl diazoacetate such as ethyl diazoacetate, in the presence of copper powder, in a suitable solvent, such as 1,2-dimethoxy-ethane, at reflux temperature and for a period of time of the order of 4½ hours, yields a product which upon chromatography is separated into the corresponding 1' - carbethoxycyclopropano - (2',3';3α,4α) - Δ⁵ - pregnen-20-one (IV; R²=ethyl) and 1'-carbethoxycyclopropano-(2'3';5β,6β)-Δ³-pregnen-20-one (V; R²=ethyl) derivatives.

In the final compounds of the above described types where a 17α-acyloxy group is present, the acyloxy is conventionally hydrolyzed with a base, thus affording the corresponding 17α-free alcohols.

The 1'-carbethoxycyclopropano derivatives (IV, V; R²=ethyl) of the present invention, upon conventional saponification with a base, yield the corresponding 1'-carboxycyclopropano derivatives (IV, V; R²=H). This hydrolysis may be concommitant with the saponification of acyloxy groups, when they are present in the same molecule.

The final compounds of the present invention having a 16α,17α-(di-lower alkyl) methylenedioxy grouping are converted into the corresponding 16α,17α-diols by treatment with 60% formic acid, at steam bath temperature, for a period of time of the order of one hour.

The 17α-hydroxyl group of compounds of the present invention is conventionally acylated, in the presence of p-toluenesulfonic acid, with a suitable acylating agent, such as an anhydride derived from a carboxylic acid of the hereinbefore defined type thus producing the corresponding 17α-acyloxy derivatives.

The 16α-hydroxyl group of compounds of the present invention is secondary and therefore is conventionally acylated in pyridine with an acylating agent, as for example propionic anhydride or caproic anhydride, thus affording the corresponding 16α-acyloxy derivatives.

The following specific examples serve to illustrate, but are not intended to limit the scope of the present invention:

PREPARATION 1

A solution of 5 g. of pregnenolone in 25 cc. of pyridine was cooled to 0° C. Under stirring there was added 1.3 g. of tosyl chloride, the mixture was kept for 16 hours at 0° C., diluted with 100 cc. of chloroform, washed with dilute hydrochloric acid, water, aqueous sodium bicarbonate solution and again with water, dried over anhydrous sodium sulfate and then evaporated to dryness under reduced pressure. Thus there was obtained the crude tosylate of pregnenolone.

The total crude compound was refluxed with 60 cc. of γ-collidine for 0 minutes under anhydrous conditions. The solution was cooled and filtered. The filtrate was diluted with ether, washed with dilute hydrochloric acid, sodium carbonate solution and water. The dried extract was evaporated and the residue was chromatographed on neutral alumina. Crystallization of the solid fractions from acetone-hexane afforded Δ³,⁵-pregnadien-20-one.

By the same procedures, 17α-acetoxy-pregnenolone, 16α-methyl-pregnenolone, 16β-methyl-pregnenolone, 17α-acetoxy-16α-methyl-pregnenolone and 16α,17α-dihydroxy-pregnenolone-16,17-acetonide were respectively converted into 17α-acetoxy-Δ³,⁵-pregnadien-20-one, 16α-methyl-Δ³,⁵-pregnadien-20-one, 16β-methyl-Δ³,⁵-pregnadien - 20 - one, 17α-acetoxy-16α-methyl-Δ³,⁵-pregnadien-20-one and 16α,17α-isopropylidendioxy-Δ³,⁵-pregnadien-20-one.

Example I

To a solution of 2 g. of Δ³,⁵-pregnadien-20-one in 50 cc. of diglyme [bis(2-methoxyethyl)ether] at 125° C. there was added 4.4 g. of sodium trichloroacetate in 10 equal portions at 10 minute intervals. The reaction mixture was then cooled, the formed sodium chloride filtered off, and the filtrate evaporated to dryness under reduced pressure. The residue was conventionally chromatographed on Florisil, thus yielding two products, which upon crystallization from methanol furnished 1',1'-dichlorocyclopropano-(2',3';3α,4α)-Δ⁵-pregnen-20-one and 1', 1'-dichlorocyclopropano-(2',3';5β,6β)-Δ³-pregnen-20-one.

Example II

To a mixture of 2 g. of Δ³,⁵-pregnadien-20-one, 50 cc. of ether and 300 mg. of powdered copper there was cautiously added a large excess of an ethereal solution of diazomethane, dropwise and with stirring. After evolution of nitrogen had ceased, the mixture was filtered and the excess reagent was decomposed by adding dropwise acetic acid until the yellow color of the filtrate disappeared. The solution was then evaporated to dryness and the residue chromatographed on Florisil, thus yielding two products, which upon crystallization from acetone-hexane furnished cyclopropano-(1',2';3α,4α)-Δ⁵-pregnen-20-one and cyclopropano-(1',2';5β,6β)-Δ³-pregnen-20-one.

Example III

A mixture of 2 g. of Δ³,⁵-pregnadien-20-one, 20 cc. of 1,2-dimethoxy ethane and 300 mg. of freshly prepared copper powder was heated to reflux temperature, then there was added dropwise with stirring, a solution of 3.4 g. of ethyl diazoacetate in 5 cc. of 1,2-dimethoxy ethane over a period of 2 hours. Refluxing was continued for an additional 2.5 hours. The catalyst was thereafter filtered off and the filtrate evaporated to dryness. The residue was conventionally chromatographed on Florisil, thus yielding two products which upon crystallization from acetone-hexane furnished 1'-carbethoxycyclopropano-(2',3';3α,4α)-Δ⁵-pregnen-20-one and 1'-carbethoxycyclopropano-(2',3';5β,6β)-Δ³-pregnen-20-one.

Example IV

A mixture of 2 g. of Δ³,⁵-pregnadien-20-one, 100 cc. of diglyme and 4 g. of sodium monochlorodifluoroacetate was refluxed for 10 minutes, then cooled to 50° C., an additional 4 g. of the same salt were thereafter added and the resulting mixture again refluxed for 10 minutes. The reaction mixture was cooled, the formed sodium chloride filtered off and the filtrate evaporated to dryness under reduced pressure. The residue was conventionally chromatographed on Florisil, thus yielding two products, which upon crystallization from methanol furnished 1',1'-difluorocyclopropano-(2',3';3α,4α)-Δ⁵ - pregnen - 20-one and 1',1'-difluorocyclopropano-(2',3';5β,6β)-Δ³-pregnen-20-one.

Example V

16α-methyl-Δ³,⁵-pregnadien-20-one was treated in accordance with Example I, thus yielding 1',1'-dichlorocyclopropano-(2',3';3α,4α)-16α-methyl-Δ⁵-pregnen-20 - one and 1',1'-dichlorocyclopropano-(2',3';5β,6β)-16α-methyl-Δ³-pregnen-20-one.

Example VI

16α-methyl-Δ$^{3,5}$-pregnadien-20-one was treated following the procedure described in Example II to produce cyclopropano - (1',2';3α,4α) - 16α-methyl-Δ$^5$-pregnen-20-one and cyclopropano-(1',2';5β,6β)-16α-methyl-Δ$^3$-pregnen-20-one.

Example VII

16α-methyl-Δ$^{3,5}$-pregnadien-20-one was treated according to Example III, thus yielding 1'-carbethoxycyclopropano-(2',3';3α,4α)-16α-methyl-Δ$^5$-pregnen - 20 - one and 1'-carbethoxycyclopropano-(2',3';5β,6β)-16α-methyl-Δ$^3$-pregnen-20-one.

Example VIII

16α-methyl-Δ$^{3,5}$-pregnadien-20-one was treated by the method of Example IV, to give 1',1'-difluorocyclopropano-(2',3';3α,4α)-16α-methyl-Δ$^5$-pregnen-20-one and 1',1'-difluorocyclopropano-(2',3';5β,6β)-16α - methyl-Δ$^3$-pregnen-20-one.

Example IX

16β-methyl-Δ$^{3,5}$-pregnadien-20-one was treated in accordance with Example I, thus yielding 1',1'-dichlorocyclopropano-(2',3';3α,4α)-16β-methyl - Δ$^5$ - pregnen-20-one and 1',1'-dichlorocyclopropano-(2',3';5β,6β)-16β-methyl-Δ$^3$-pregnen-20-one.

Example X

16β-methyl-Δ$^{3,5}$-pregnadien-20-one was treated following the procedure described in Example II, to produce cyclopropano-(1',2';3α,4α)-16β-methyl-Δ$^5$ - pregnen - 20-one and cyclopropano-(1',2';5β,6β)-16β-methyl-Δ$^3$-pregnen-20-one.

Example XI

16β-methyl-Δ$^{3,5}$-pregnadien-20-one was treated according to Example III, thus yielding 1'-carbethoxycyclopropano-(2',3';3α,4α) - 16β - methyl-Δ$^5$-pregnen-20-one and 1'-carbethoxycyclopropano-(2',3';5β,6β)-16β-methyl-Δ$^3$-pregnen-20-one.

Example XII

16β-methyl-Δ$^{3,5}$-pregnadien-20-one was treated by the method of Example IV, to give 1',1'-difluorocyclopropano-(2',3';3α,4α) - 16β-methyl-Δ$^5$-pregnen - 20-one and 1',1'-difluorocyclopropano-(2',3';5β,6β)-16β-methyl - Δ$^3$-pregnen-20-one.

Example XIII

17α-acetoxy-Δ$^{3,5}$-pregnadien-20-one was treated in accordance with Example I, thus yielding 1',1'-dichlorocyclopropano-(2',3';3α,4α)-17α - acetoxy- - Δ$^5$-pregnen-20-one and 1',1'-dichlorocyclopropano-(2',3';5β,6β)-17α-acetoxy-Δ$^3$-pregnen-20-one.

Example XIV

17α-acetoxy-Δ$^{3,5}$-pregnadien-20-one was treated following the procedure described in Example II, to produce cyclopropano-(1',2';3α,4α)-17α-acetoxy - Δ$^5$-pregnen-20-one and cyclopropano-(1',2';5β,6β)-17α-acetoxy-Δ$^3$-pregnen-20-one.

Example XV

17α-acetoxy-Δ$^{3,5}$-pregnadien-20-one was treated according to Example III, thus yielding 1'-carbethoxycyclopropano-(2',3';3α,4α)-17α - acetoxy-Δ$^5$-pregnen - 20-one and 1'-carbethoxycyclopropano-(2',3';5β,6β)-17α-acetoxy-Δ$^3$-pregnen-20-one.

Example XVI

17α-acetoxy-Δ$^{3,5}$-pregnadien-20-one was treated by the method of Example IV, to give 1',1'-difluorocyclopropano-(2',3';3α,4α) - 17α-acetoxy-Δ$^5$-pregnen-20-one and 1',1'-difluorocyclopropano-(2',3';5β,6β)-17α - acetoxy-Δ$^3$-pregnen-20-one.

Example XVII

17α-acetoxy-16α-methyl-Δ$^{3,5}$-pregnadien - 20 - one was treated in accordance with Example I, thus yielding 1',1'-dichlorocyclopropano-(2',3';3α,4α)-17α - acetoxy - 16α-methyl-Δ$^5$-pregnen-20-one and 1',1'-dichlorocyclopropano-(2',3';5β,6β)-17α-acetoxy-16α-methyl-Δ$^3$ - pregnen-20-one.

Example XVIII

17α-acetoxy-16α-methyl-Δ$^{3,5}$-pregnadien - 20 - one was treated following the procedure described in Example II to produce cyclopropano-(1',2';3α,4α)-17α-acetoxy-16α-methyl-Δ$^5$-pregnen-20-one and cyclopropano-(1',2';5β,6β)-17α-acetoxy-16α-methyl-Δ$^3$-pregnen-20-one.

Example XIX

17α-acetoxy-16α-methyl-Δ$^{3,5}$-pregnadien - 20 - one was treated according to Example III, thus yielding 1'-carbethoxycyclopropano-(2',3';3α,4α) - 17α - acetoxy-16α-methyl-Δ$^5$-pregnen-20-one and 1'-carbethoxycyclopropano-(2',3';5β,6β)-17α - acetoxy-16α - methyl-Δ$^3$-pregnen-20-one.

Example XX

17α-acetoxy-16α-methyl-Δ$^{3,5}$-pregnadien - 20 - one was treated by the method of Example IV, to give 1',1'-difluorocyclopropano-(2',3';3α,4α) - 17α-acetoxy-16α-methyl-Δ$^5$-pregnen-20-one and 1',1' - difluorocyclopropano-(2',3';5β,6β)-17α-acetoxy-16α-methyl-Δ$^3$-pregnen-20-one.

Example XXI

16α,17α-isopropylidendioxy-Δ$^{3,5}$-pregnadien-20-one was treated in accordance with Example I, thus yielding 1',1'-dichlorocyclopropano - (2',3';3α,4α)-16α,17α-isopropylidendioxy-Δ$^5$-pregnen-20-one and 1',1'-dichlorocyclopropano-(2',3';5β,6β) - 16α,17α-isopropylidendioxy-Δ$^3$-pregnen-20-one.

Example XXII

16α,17α-isopropylidendioxy-Δ$^{3,5}$-pregnadien-20-one was treated following the procedure described in Example II, to produce cyclopropano - (1',2';3a,4a) - 16a,17a-isopropylidendioxy-Δ$^5$-pregnen-20-one and cyclopropano-(1',2';5β,6β)-16a,17a-isopropylidendioxy-Δ$^3$-pregnen - 20-one.

Example XXIII

16α,17α-isopropylidendioxy-Δ$^{3,5}$-pregnadien-20-one was treated according to Example III, thus yielding 1'-carbethoxycyclopropano - (2',3';3α,4α) - 16α,17α-isopropylidendioxy-Δ$^5$-pregnen-20-one and 1'-carbethoxycyclopropano - (2',3';5β,6β) - 16α,17α - isopropylidendioxy - Δ$^3$ - pregnen-20-one.

Example XXIV

16α,17α-isopropylidendioxy-Δ$^{3,5}$-pregnadien-20-one was treated by the method of Example IV, to give 1',1'-difluorocyclopropano - (2',3'; 3α,4α) - 16α,17α - isopropylidendioxy-Δ$^5$-pregnen-20-one and 1',1'-difluorocyclopropano - (2',3';5β,6β)-16α,17α-isopropylidendioxy-Δ$^3$-pregnen-20-one.

Example XXV

A solution of 0.17 g. of potassium hydroxide in 0.2 cc. of water and 2.5 cc. of methanol was added over 30 minutes to a boiling solution of 1 g. of 1',1'-dichlorocyclopropano - (2',3';3α,4α) - 17α - acetoxy - Δ$^5$ - pregnen-20-one in 30 cc. of methanol under an atmosphere of nitrogen. Boiling was continued for a further 2 hours and the solution was then cooled, neutralized with acetic acid and concentrated under reduced pressure. Addition of water, followed by crystallization of the precipitated solid from acetone-hexane, produced 1',1'-dichlorocyclopropano-(2',3';3α,4α)-Δ$^5$-pregnen-17α-ol-20-one.

The final compounds of Examples XIII, XIV, XVI, XVII, XVIII and XX were treated by the same procedure, thus affording the corresponding 17α-alcohols.

Example XXVI 1 g. of 1',1'-dichlorocyclopropano-(2',3';3α,4α)-16α,17α-isopropylidendioxy-Δ⁵-pregnen-20-one was heated on the stream bath with 20 cc. of 60% formic acid for 1 hour, cooled, diluted with water and the precipitate was collected, washed with water, dried, and recrystallized from acetone-hexane, thus affording 1',1'-dichlorocyclopropano-(2',3';3α,4α)-Δ⁵-pregnene-16α,17α-diol-20-one.

Using exactly the same conditions,

1',1'-dichlorocyclopropano-(2',3';5β,6β)-16α,17α-isopropylidendioxy-Δ³-pregnen-20-one,
1',1'-difluorocyclopropano-(2',3';5β,6β)-16α,17α-isopropylidendioxy-Δ³-pregnen-20-one,
1',1'-difluorocyclopropano-(2',3';3α,4α)-16α,17α-isopropylidendioxy-Δ⁵-pregnen-20-one,
1'-carbethoxycyclopropano-(2',3';3α,4α)-16α,17α-isopropylidendioxy-Δ⁵-pregnen-20-one,
1'-carbethoxycyclopropano-(2',3';5β,6β)-16α,17α-isopropylidendioxy-Δ³-pregnen-20-one,
cyclopropano-(1',2';3α,4α)-16α,17α-isopropylidendioxy-Δ⁵-pregnen-20-one and
cyclopropano-(1',2';5β,6β)-16α,17α-isopropylidendioxy-Δ³-pregnen-20-one were converted respectively into 1',1'-dichlorocyclopropano-(2',3';5β,6β)-Δ³-pregnene-16α,17α-diol-20-one,
1',1'-difluorocyclopropano-(2',3';5β,6β)-Δ³-pregnene-16α,17α-diol-20-one,
1',1'-difluorocyclopropano-(2',3';3α,4α)-Δ⁵-pregnene-16α,17α-diol-20-one,
1'-carbethoxycyclopropano-(2',3';3α,4α)-Δ⁵-pregnene-16α,17α-diol-20-one,
1'-carbethoxycyclopropano-(2',3';5β,6β)-Δ³-pregnene-16α,17α-diol-20-one,
cyclopropano-(1',2';3α,4α)-Δ⁵-pregnene-16α,17α-diol-20-one and
cyclopropano-(1',2';5β,6β)-Δ³-pregnene-16α,17α-diol-20-one.

Example XXVII

A mixture of 1 g. of 1',1'-dichlorocyclopropano-(2',3';3α,4α)-Δ⁵-pregnene-16α,17α-diol-20-one, 4 cc. of pyridine and 2 cc. of propionic anhydride was kept at room temperature overnight, poured into ice water, the formed precipitate was filtered, washed with water and dried. Crystallization from acetone-hexane gave the 16-propionate of 1',1'-dichlorocyclopropano-(2',3';3α,4α)-Δ⁵-pregnene-16α,17α-diol-20-one.

The following starting compounds were treated by the same procedure:

1',1'-difluorocyclopropano-(2',3';5β,6β)-Δ³-pregnene-16α,17α-diol-20-one,
1'-carbethoxycyclopropano-(2',3';5β,6β)-Δ³-pregnene-16α,17α-diol-20-one,
1'-carbethoxycyclopropano-(2',3';3α,4α)-Δ⁵-pregnene-16α,17α-diol-20-one and
cyclopropano-(1',2';3α,4α)-Δ⁵-pregnene-16α,17α-diol-20-one, thus yielding the respective 16-propionates.

Example XXVIII

To a solution of 5 g. of 1',1'-dichlorocyclopropano-(2',3';3α,4α)-Δ⁵-pregnen-17α-ol-20-one in 100 cc. of anhydrous benzene there were added 1 g. of p-toluene-sulfonic acid and 10 cc. of caproic anhydride and the mixture was allowed to stand for 24 hours at room temperature, poured into ice and water, and the resulting mixture stirred to effect hydrolysis of the excess anhydride. The benzene layer was separated and washed with 10% sodium carbonate solution and water. Drying, evaporation and crystallization of the residue from ether-hexane produced the 17-caproate of 1',1'-dichlorocyclopropano-(2',3';3α,4α)-Δ⁵-pregnen-17α-ol-20-one.

1,1'-difluorocyclopropano-(2',3';5β,6β)-Δ³-pregnen-17α-ol-20-one,
1,1'-difluorocyclopropano, cyclopropano-(1',2';5β,6β)-Δ³-pregnen-17α-ol-20-one and
cyclopropano-(1',2';3α,4α)-Δ⁵-pregnen-17α-ol-20-one were treated by the same method thus yielding the corresponding 17-caproates.

Example XXIX

1'-carbethoxycyclopropano-(2',3';3α,4α)-17α-acetoxy-Δ⁵-pregnen-20-one,
1'-carbethoxycyclopropano-(2',3';5β,6β)-17α-acetoxy-Δ³-pregnen-20-one,
1'-carbethoxycyclopropano-(2',3';5β,6β)-17α-acetoxy-16α-methyl-Δ³-pregnen-20-one and
1'-carbethoxycyclopropano-(2',3';3α,4α)-17α-acetoxy-16α-methyl-Δ⁵-pregnen-20-one were treated in accordance with Example XXV thus furnishing respectively 1'-carboxycyclopropane-(2',3';3α,4α)-Δ⁵-pregnen-17α-ol-20-one,
1'-carboxycyclopropane-(2',3';5β,6β)-Δ³-pregnen-17α-ol-20-one,
1'carboxycyclopropane-(2',3';5β,6β)-16α-methyl-Δ³-pregnen-17α-ol-20-one and
1'-carboxycyclopropane-(2',3';3α,4α)-16α-methyl-Δ⁵-pregnen-17α-ol-20-one.

Example XXX

The final products of Example XXIX were treated in accordance with Example XXVIII, thus giving the corresponding 17-caproates.

Example XXXI

The 16-propionate of 1',1'-dichlorocyclopropano-(2',3';3α,4α)-Δ⁵-pregnene-16α,17α-diol-20-one and the 16-propionate 1',1'-difluorocyclopropano-(2',3';5β,6β)-Δ³-pregnene-16α,17α-diol-20-one were treated in accordance with Example XXVIII giving respectively: the 16-propionate-17-caproate of 1',1'-dichlorocyclopropano-(2',3';3α,4α)-Δ⁵-pregnene-16α,17α-diol-20-one and the 16-propionate-17-caproate of 1',1'-difluorocyclopropano-(2',3';5β,6β)-Δ³-pregnene-16α,17α-diol-20-one.

I claim:

1. A compound of the following formula:

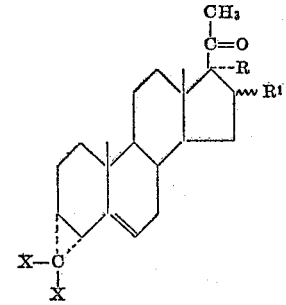

wherein X is selected from the group consisting of hydrogen, fluorine and chlorine; R is a member of the group consisting of hydrogen, hydroxyl and a hydrocarbon carboxylic acyloxy group of less than 12 carbon atoms; $R^1$ is selected from the group consisting of hydrogen, α-methyl, β-methyl, α-hydroxyl and an α-hydrocarbon carboxylic acyloxy group of less than 12 carbon atoms; and R and $R^1$ together represent the group $$\begin{array}{c} \cdots O \diagdown \diagup R^3 \\ C \\ \cdots O \diagup \diagdown R^3 \end{array}$$

wherein $R^3$ is a lower alkyl group.

2. 1',1'-dichlorocyclopropano-(2',3';3α,4α)-Δ⁵-pregnen-20-one.

3. 1',1'-difluorocyclopropano-(2',3';3α,4α)-Δ⁵-pregnen-20-one.
4. Cyclopropano-(1',2';3α,4α)-Δ⁵-pregnen-20-one.
5. 1',1'-difluorocyclopropano-(2',3';3α,4α)-16α-methyl-Δ⁵-pregnen-20-one.
6. A compound of the following formula:

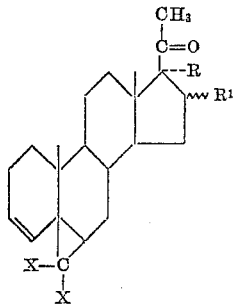

wherein X is selected from the group consisting of hydrogen, fluorine and chlorine; R is a member of the group consisting of hydrogen, hydroxyl and a hydrocarbon carboxylic acyloxy group of less than 12 carbon atoms; $R^1$ is selected from the group consisting of hydrogen, α-methyl, β-methyl, α-hydroxyl and an α-hydrocarbon carboxylic acyloxy group of less than 12 carbon atoms; and R and $R^1$ together represent the group

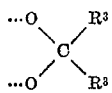

wherein $R^3$ is a lower alkyl group.

7. 1',1'-dichlorocyclopropano-(2',3';5β,6β)-Δ³-pregnen-20-one.
8. 1',1'-difluorocyclopropano-(2',3';5β,6β)-Δ³-pregnen-20-one.
9. Cyclopropano-(1',2';5β,6β)-Δ³-pregnen-20-one.
10. 1',1'-difluorocyclopropano-(2',3';5β,6β)-16α-methyl-Δ³-pregnen-20-one.
11. A compound of the following formula:

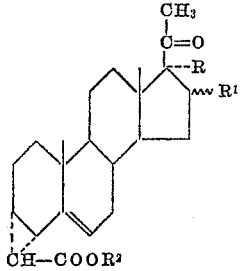

wherein R is a member of the group consisting of hydrogen, hydroxyl and a hydrocarbon carboxylic acyloxy group of less than 12 carbon atoms; $R^1$ is selected from the group consisting of hydrogen, α-methyl, β-methyl, α-hydroxyl and an α-hydrocarbon carboxylic acyloxy group of less than 12 carbon atoms; R and $R^1$ together represent the group

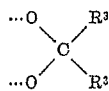

wherein $R^3$ is a lower alkyl group; and $R^2$ is a member of the group consisting of hydrogen and lower alkyl.

12. 1' - carbethoxycyclopropano - (2',3';3α,4α) - Δ⁵-pregnen-20-one.
13. 1' - carboxycyclopropano - (2',3';3α,4α) - Δ⁵-pregnen-20-one.
14. 1' - carbethoxycyclopropano - (2',3';3α,4α) - 16α-methyl-Δ⁵-pregnen-20-one.
15. 1'-carbethoxycyclopropano - (2',3';3α,4α) - 16β-methyl-Δ⁵-pregnen-20-one.
16. A compound of the following formula:

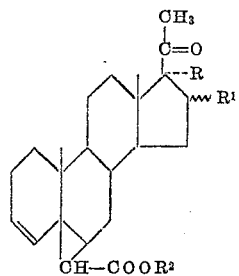

wherein R is a member of the group consisting of hydrogen, hydroxyl and a hydrocarbon carboxylic acyloxy group of less than 12 carbon atoms; $R^1$ is selected from the group consisting of hydrogen, α-methyl, β-methyl, α-hydroxyl and an α-hydrocarbon carboxylic acyloxy group of less than 12 carbon atoms; R and $R^1$ together represent the group

wherein $R^3$ is a lower alkyl group; and $R^2$ is a member of the group consisting of hydrogen and lower alkyl.

17. 1' - carbethoxycyclopropano - (2',3';5β,6β) - Δ³-pregnen-20-one.
18. 1' - carboxycyclopropano - (2',3';5β,6β)-Δ³-pregnen-20-one.
19. 1' - carbethoxycyclopropano - (2',3';5β,6β) - 16α-methyl-Δ³-pregnen-20-one.
20. 1' - carbethoxycyclopropano - (2',3';5β,6β) - 16β-methyl-Δ³-pregnen-20-one.

No references cited.